United States Patent [15] 3,645,748
Ilines [45] Feb. 29, 1972

[54] POTATO STRIP AND METHOD OF PRODUCING FRENCH FRIED POTATOES

[72] Inventor: Laurence James Ilines, 7 Feldbar Court, Willowdale, Ontario, Canada

[22] Filed: Mar. 22, 1967
[21] Appl. No.: 625,231

[52] U.S. Cl. ...........................................................99/100
[51] Int. Cl. .........................................................A23l 1/12
[58] Field of Search ..........................99/100, 100 P; 90/100 P

[56] References Cited

UNITED STATES PATENTS

| 3,085,020 | 4/1963 | Backinger et al. | 99/100 |
| 3,215,094 | 11/1965 | Oldershaw et al. | 99/100 |
| 3,391,005 | 7/1968 | Babigan | 99/100 |

Primary Examiner—A. Louis Monacell
Assistant Examiner—William A. Simons
Attorney—George A. Rolston

[57] ABSTRACT

An uncooked strip of extruded potato mix having an elongated body and a polygonal cross section defined by concave sides of predetermined radius of curvature substantially equal to the mean of the longest and shortest dimension of the cross section of the strip meeting at rounded corners, said rounded corners having a predetermined radius of curvature which is substantially equal to about one-eleventh of the radius of said concave sides, the concave sides being deformable by cooking to acquire a flat condition while said rounded corners remain unchanged.

5 Claims, 7 Drawing Figures

PATENTED FEB 29 1972  3,645,748
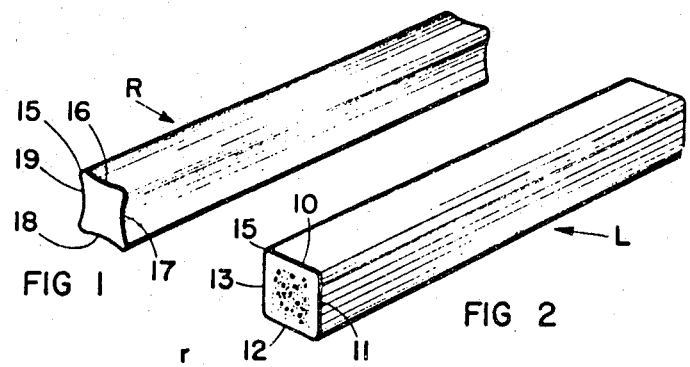
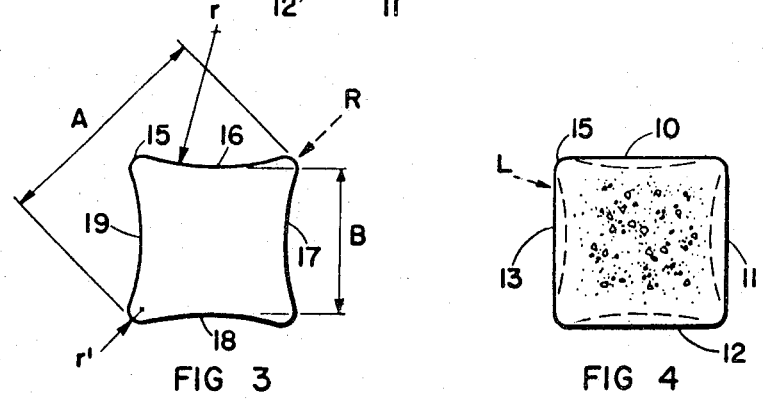
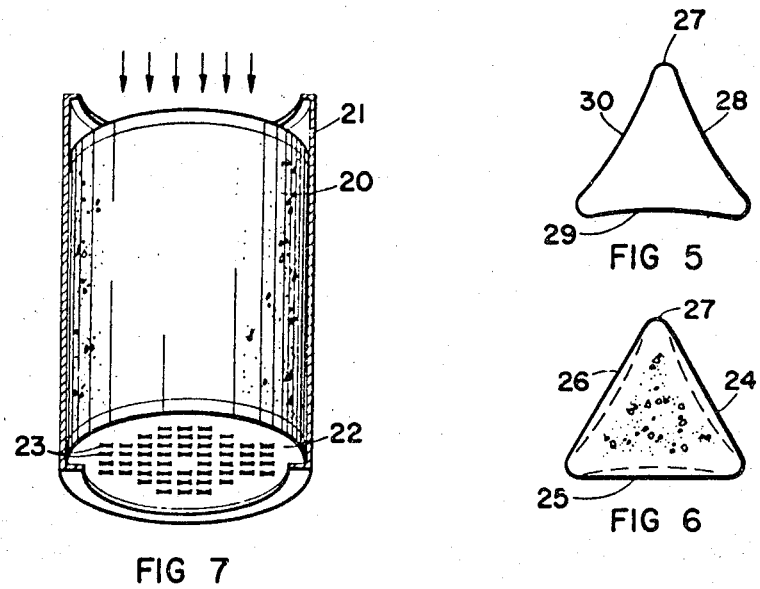
INVENTOR
LAURENCE J. ILINES
BY Cavanagh & Norman

POTATO STRIP AND METHOD OF PRODUCING FRENCH FRIED POTATOES

The present invention relates to french fried potatoes and is concerned primarily with the method of producing french fried potatoes of a desired cross-sectional shape and particularly in the cross-sectional shape of a raw strip extruded from a potato flour mix.

Customers of french fried potatoes are often desirous that the potatoes served to them have a particular appearance which is determined by the cross-sectional shape of the potato strips. It has been proposed to form the strips from a raw potato flour mix which is extruded to form the strips. However, it has been found that frying in deep fat distorts the shape of the raw strip so that the cooked product does not have the same cross-sectional shape which obtained in the strips before cooking.

Thus an important object of the present invention is to provide a method of producing french fried potatoes which includes the step of extruding a potato flour mix into strips having a cross-sectional shape, that is, related to the desired shape of the cooked product together with the step of cooking in deep fat to achieve the ultimate shape desired.

An other object is to provide an extruded potato strip having a cross-sectional shape which provides a desired cross-sectional shape in the cooked product.

The most popular shape of french fried potatoes is a square cross section. If a raw strip is of a square cross section, cooking thereof distorts the sides into convex shapes which constitute a material departure from the square shape that is so popular. In accordance with the present invention, the potato flour mix is extruded into a strip having four concave sides which meet at rounded corners. The curvature of these sides is predetermined so that cooking deforms them into the straight-sided structure desired in the ultimate product.

It has been found, as a practical matter, that is is impossible to preserve square or sharp corners in a potato strip. Thus an important feature in the invention is to provide a square strip of the character above noted which has rounded corners. Moreover, it is important that these corners be of such a curvature as to practically preclude impairment thereof during the extruding and subsequent cooking processes. Thus the relation of the rounded corners to the dimensions of the strip and the curvature of the sides is of importance. Also the radius of curvature of the concave sides should be properly related to the dimensions of the strip.

Some of the more detailed objects and advantages of the invention such as those which arise in connection with carrying out the above-noted ideas in a practical embodiment will, in part, become apparent and in part be hereinafter stated.

For a full and more complete understanding of the invention, reference may be had to the following description and accompanying drawing, wherein:

FIG. 1 is a perspective view of a raw potato strip shaped and dimensioned in accordance with the precepts of this invention;

FIG. 2 is a perspective view of the potato strip of FIG. 1 after cooking in deep fat;

FIG. 3 is a diagrammatic view depicting the shape of a cross section of the raw strip before cooking;

FIG. 4 is another schematic view showing the cross-sectional shape of the cooked strip as superimposed on the shape of the raw strip;

FIG. 5 is a view similar to FIG. 3 but of a raw strip of triangular shape;

FIG. 6 is a view similar to FIG. 4 depicting the strip of FIG. 5 after cooking and as superimposed on the raw strip, and;

FIG. 7 is a perspective view of a portion of the extruding apparatus illustrating how the strips are extruded in multiple.

Referring now to the drawings, and first more particularly to FIGS. 1 to 4 inclusive, a cooked potato strip is illustrated in FIGS. 2 and 4, this strip has a cross section defined by sides 10, 11, 12 and 13, all of equal length thereby defining a square cross section.

The sides 10, 11, 12 and 13 are joined at rounded corners 15.

Referring now to FIGS. 1 and 3, the uncooked strip from which the strip L was made is identified in its entirety by the reference character R. It is defined by four sides of equal size and shape which are identified at 16,17,18 and 19, all being joined by the rounded corners 15. It will be noted that the sides 16 to 19 inclusive are arcuate with the side 16 corresponding to the side 10 and the side 17 to the side 11, side 18 to the side 12 and the side 19 to the side 13.

The longest dimension of the raw strip R is depicted in FIG. 3 and represented by the reference character A. It is, in fact, the diagonal of the square. The shortest dimension of the strip R is represented by B and is the distance across the shortest distance between opposed sides 16 and 18. Of course, this same distance would obtain between the sides 17 and 19.

The radius of the arcuate sides 16 to 19 inclusive may be represented by the reference character $r$ and the radius of the rounded corners 15 by the reference character $r'$. Purely by way of example, one set of dimensions which may obtain in the strip R are given as being illustrative of the proportions which obtain between the radii $r$ and $r'$ and also the ratio of these radii to the dimensions of the strip R.

Thus if the dimension B is two hundred and seventy-five thousandths of an inch, dimension A will be four hundred and ten thousandths of an inch. The curvature of the arcuate sides 16 to 19 inclusive, which is represented at $r$ is determined by a radius of eleven thirty-seconds of an inch and the curvature of the corners represented by $r'$ is determined by a radius of one thirty-second of an inch.

Thus it may be stated that the radius of the curvature of the corners is about one-thirteenth of the largest dimension of the strip, or about one-ninth the smallest dimension, also. The radius of the curvature of the arcuate sides $r$ is about 11 times the curvature of the rounded corners $r'$. Moreover, the radius of curvature of the arcuate sides is substantially equal to the mean or average of the longest and shortest dimensions of the strip.

Referring now more particularly to FIG. 7, a potato flour mix is therein illustrated at 20 as being received in a container 21 having a bottom extrusion plate 22 formed with apertures 23 of the shape corresponding to the raw strip R.

In practising the method of the invention, the potato flour mix is first prepared and introduced into the container 21. Pressure is then applied thereto to extrude the strips R in multiple through the openings 23. These strips will have the concave side shape illustrated in FIGS. 1 and 3. They are now cooked in deep fat for a prescribed period of time, whereupon the sides are distorted and caused to swell out into the straight sided formation illustrated in FIGS. 2 and 4.

FIGS. 5 and 6 illustrate a potato strip which is of triangular shape, thus FIG. 6 illustrates the form of the finished product including the straight sides 24, 25 and 26. These sides are joined at the rounded corners 27. In FIG. 5 the raw strip is shown as having the arcuate sides 28, 29 and 30 which are joined at the rounded corners 27. It is believed that substantially the same relation between the curvature of the rounded corners 27 and the arcuate sides 24, 25 and 26 will obtain as described above, in connection with FIGS. 1 to 4 inclusive.

The basic factor underlying the present invention is the recognition of the phenomenon that the shape of a raw strip can never be maintained during cooking. It must be designed in advance to give the shape desired in the finished product. Also, that when any type of a polygonal construction is desired, such as one of square cross section the rounded corners must be of a curvature that is properly related to the arcuate curvature of the sides and the maximum and minimum dimensions of the strip.

While preferred and specific embodiments of the invention are hereinbefore set forth, it is to be clearly understood that the invention is not to be limited the exact steps, dimensions and shapes illustrated and described because various modifications of these details may be provided in putting the invention into practice within the purview of the appended claims.

What is claimed is:

1. An uncooked strip of an extruded potato mix, said strip comprising an elongated body having a polygonal cross section defined by concave sides of predetermined radius of curvature substantially equal to the mean of the longest and shortest dimension of the cross section of the strip meeting at rounded corners said rounded corners having a predetermined radius of curvature which is substantially equal to about one-eleventh of the radius of said concave sides; the concave sides being deformable by cooking of said body to acquire a substantially flat condition while said rounded corners remain substantially unchanged.

2. The potato strip of claim 1 in which said polygonal cross section has four sides and four corners.

3. The potato strip of claim 1 which is of square cross section and in which the rounded corners are arcuate as determined by a radius which is substantially one-eleventh the radius that determines the curvature of the concave sides.

4. In a method of producing french fried potatoes, the steps of: preparing a mix from potato flour; extruding said mix into multiple strips each having an elongate body of a polygonal cross section shape defined by concave sides of predetermined radius of curvature meeting substantially equal to the mean of the longest and shortest dimension of the cross section of the strip at rounded corners; said rounded corners having a predetermined radius of curvature which is substantially equal to about one-eleventh of the radius of said concave sides; and then cooking said strips in deep fat whereby said curved sides are deformed into a desired substantially flat condition while said rounded corners remain substantially unchanged.

5. The method of claim 4 in which the extruded strips have four said concave sides and four said rounded corners.

* * * * *